(12) United States Patent
Hähre et al.

(10) Patent No.: US 10,870,357 B2
(45) Date of Patent: Dec. 22, 2020

(54) CHARGING STATION

(71) Applicant: Dr. Ing. h.c. F. Porsche Aktiengesellschaft, Stuttgart (DE)

(72) Inventors: Karsten Hähre, Dudenhofen (DE); Raoul Heyne, Goslar (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 345 days.

(21) Appl. No.: 15/912,955

(22) Filed: Mar. 6, 2018

(65) Prior Publication Data

US 2018/0257501 A1 Sep. 13, 2018

(30) Foreign Application Priority Data

Mar. 7, 2017 (DE) .................. 10 2017 104 730

(51) Int. Cl.
| | | |
|---|---|---|
| *H02J 7/00* | (2006.01) | |
| *H02J 7/14* | (2006.01) | |
| *B60L 11/18* | (2006.01) | |
| *B60L 53/31* | (2019.01) | |
| *B60L 53/57* | (2019.01) | |
| *B60L 53/14* | (2019.01) | |
| *B60L 53/60* | (2019.01) | |
| *B60L 53/302* | (2019.01) | |
| *F25B 30/06* | (2006.01) | |

(52) U.S. Cl.
CPC .......... *B60L 11/1825* (2013.01); *B60L 53/14* (2019.02); *B60L 53/302* (2019.02); *B60L 53/31* (2019.02); *B60L 53/57* (2019.02); *B60L 53/60* (2019.02); *F25B 30/06* (2013.01); *Y02T 10/70* (2013.01); *Y02T 10/7072* (2013.01)

(58) Field of Classification Search
USPC ........................................... 320/109
See application file for complete search history.

(56) References Cited

U.S. PATENT DOCUMENTS

| | | | |
|---|---|---|---|
| 8,651,704 B1 | 2/2014 | Gordin et al. | |
| 2008/0148733 A1 | 6/2008 | Fein et al. | |
| 2011/0246259 A1* | 10/2011 | Hostyn | B60L 53/305 |
| | | | 705/7.31 |
| 2012/0249065 A1* | 10/2012 | Bissonette | B60L 53/53 |
| | | | 320/109 |
| 2013/0193918 A1* | 8/2013 | Sarkar | B60L 53/52 |
| | | | 320/109 |

(Continued)

FOREIGN PATENT DOCUMENTS

| | | |
|---|---|---|
| CN | 204786902 U | 11/2015 |
| EP | 2993748 A1 | 3/2016 |

OTHER PUBLICATIONS

German Search Report for German Application No. 10 2017 104 730.1, dated Mar. 2, 2018 with partial English translation, 7 pages.

*Primary Examiner* — Alexis B Pacheco
(74) *Attorney, Agent, or Firm* — RatnerPrestia

(57) ABSTRACT

A charging station, such as, in particular, a charging column, includes an electrical connection for supplying current/voltage to the charging station, a charging connection for connecting at least one electrical energy store that is to be charged, and a thermal connection to a geothermal temperature control device for controlling the temperature of the charging station by geothermal energy.

15 Claims, 2 Drawing Sheets

(56) References Cited

U.S. PATENT DOCUMENTS

| | | | |
|---|---|---|---|
| 2014/0049217 A1* | 2/2014 | Nakagawa | B60L 53/52 320/109 |
| 2014/0375272 A1* | 12/2014 | Johnsen | B60L 53/14 320/136 |
| 2015/0039391 A1* | 2/2015 | Hershkovitz | G06Q 10/04 705/7.31 |
| 2015/0113987 A1 | 4/2015 | Mackler et al. | |
| 2015/0130281 A1* | 5/2015 | Sabripour | H02J 3/32 307/66 |
| 2016/0156075 A1* | 6/2016 | Lindholm | H01M 10/6568 165/104.21 |

\* cited by examiner

CHARGING STATION

CROSS-REFERENCE TO RELATED APPLICATION

This application claims priority to German Patent Application No. DE 10 2017 104 730.1, filed Mar. 7, 2017, which is incorporated by reference herein in its entirety.

FIELD OF THE INVENTION

The invention relates to a charging station, in particular charging column, in particular for charging electrical energy stores of electrically operated motor vehicles.

BACKGROUND OF THE INVENTION

Electrically operated motor vehicles, that is to say, in particular, motor vehicles having an electric drive or possibly having a hybrid drive, have an electrical energy store in order to supply the electrical drive with power. The electrical energy store can in this case be charged by means of a charging station when required.

In this case, it is apparent that the electronics system of the charging station or else other components possibly heat up significantly during the charging process. Cooling of the electronics system and/or of the components of the charging station is accordingly at least helpful, if not necessary, in fact. In cold regions or in cold seasons, heating of the electronics system and/or of the components of the charging station is at least helpful, if not necessary, in fact.

EP 2 993 748 A1, which is incorporated by reference herein, discloses a charging column for electrically operated vehicles, said charging column having a main body made of concrete and having a foundation embedded in the ground. In the charging column, heat is emitted at the foundation and the charging column is thus cooled. It is apparent, however, that the cooling that can be achieved in this way is at least sometimes insufficient.

Cooling the charging column using air has the disadvantage that the air has to be able to flow past the relevant components and electronics system component parts, which, on the one hand, can generate an inconvenient noise and which leads to insects and very small animals likewise being able to get into the charging column, which is undesirable.

SUMMARY OF THE INVENTION

Described herein is a charging station that is of simple design and the temperature of which can be safely controlled.

One exemplary embodiment of the invention relates to a charging station, such as, in particular, a charging column, having an electrical connection for supplying current/voltage to the charging station, having a charging connection for connecting at least one electrical energy store that is to be charged, having a thermal connection to a geothermal temperature control device for controlling the temperature of the charging station by means of geothermal energy. The temperature of the charging station and/or the electronics system of the charging station and/or other components of the charging station can accordingly be controlled by means of geothermal energy.

In this case, it is particularly advantageous when a heat exchanger or a heat pump is provided, by means of which the temperature of a coolant is controlled by means of geothermal energy, wherein the coolant circulates in the charging station and controls the temperature of an electronics system and/or other components of the charging station. As a result, the charging station can be connected to a corresponding geothermal temperature control device by means of the heat exchanger or the heat pump.

In this case, it is particularly advantageous when the heat exchanger or the heat pump has a coolant connection for connecting to an, in particular charging-station-internal, coolant circuit and/or the heat exchanger or the heat pump has a geothermal connection for connecting to a geothermal fluid circuit. As a result, the temperature of a coolant that circulates in the charging station can be controlled by means of a fluid in the geothermal fluid circuit.

It is thus also advantageous when the coolant circuit is provided in such a way that the temperature of the electronics system and/or other components of the charging station is controlled by a cooling fluid flowing through the coolant circuit. As a result, good efficiency of the temperature control, such as cooling and/or heating, is achieved.

It is also advantageous when a first pump is provided, said first pump conveying the fluid in the coolant circuit, in particular to the heat exchanger or to the heat pump and from there back again. As a result, the coolant in the coolant circuit can be forced to flow and circulate, which improves the temperature control of the charging station, electronics system and/or other components.

Furthermore, it is also expedient when the geothermal fluid circuit is provided in such a way that at least one ground borehole is provided in the region of the charging station, in which ground borehole fluid lines are arranged such that the temperature of a fluid flowing through the fluid lines is controlled by the geothermal energy. As a result, effective temperature control is achieved by means of geothermal energy.

It is also advantageous when a second pump is provided, said second pump conveying the fluid in the fluid lines of the geothermal fluid circuit, in particular to the heat exchanger or to the heat pump and from there back again. As a result, improved efficiency of the temperature control is also achieved by means of geothermal energy because the flow through the heat exchanger or the heat pump can be better and more uniform.

It is also advantageous when the fluid of the geothermal fluid circuit is a saline liquid. As a result, the fluid can be used virtually all year round and is protected against freezing.

It is also advantageous when the fluid of the coolant circuit is a water/glycol mixture. This likewise serves for operation all year round with protection against freezing.

It is also particularly advantageous when the charging station and/or the electronics system thereof and/or the components thereof can be cooled and/or heated by means of the geothermal energy.

BRIEF DESCRIPTION OF THE DRAWINGS

Below, the invention will be discussed in detail on the basis of an exemplary embodiment and with reference to the drawing. In the drawing.

DETAILED DESCRIPTION OF THE INVENTION

Figure 1:
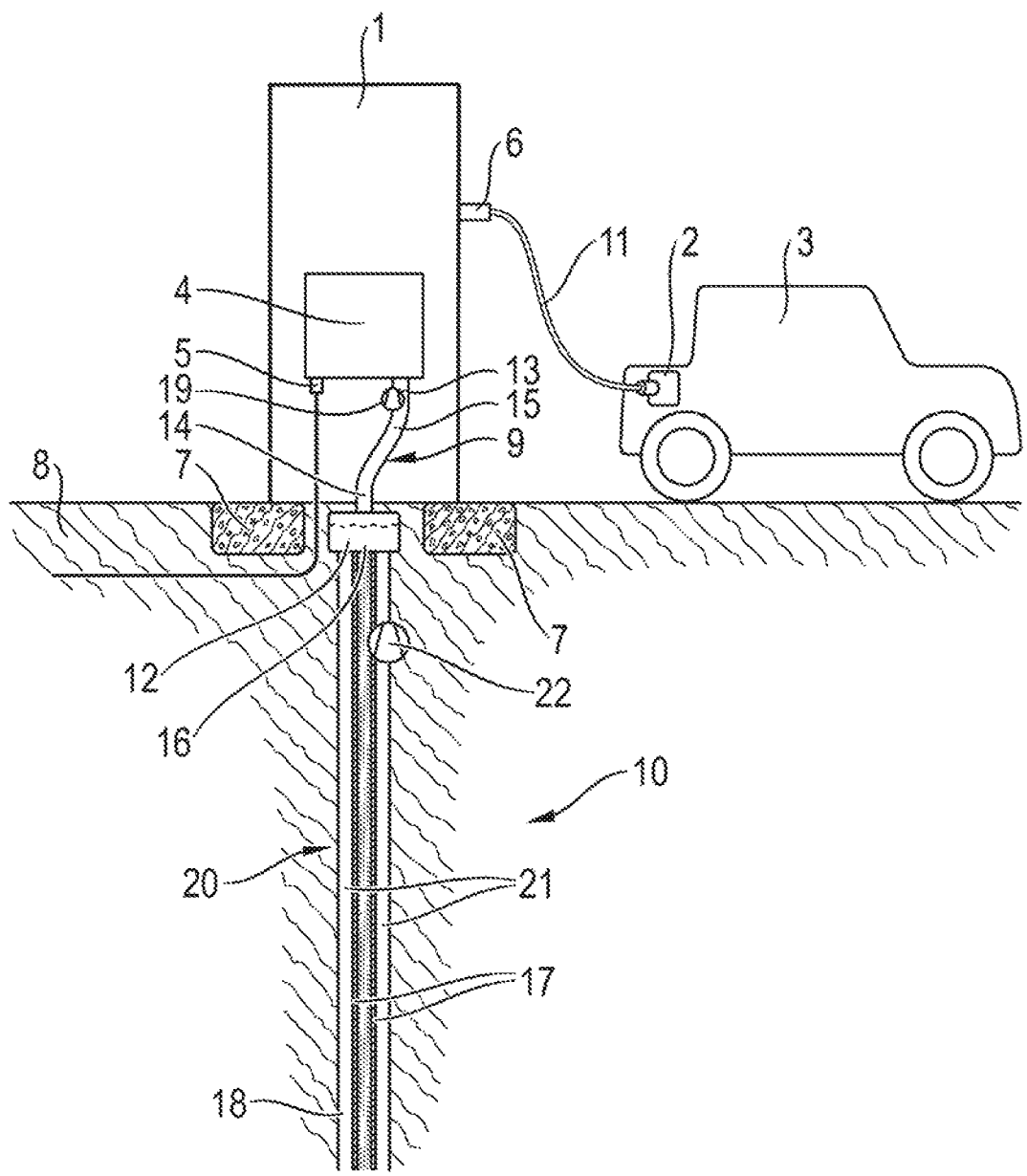
FIG. 1 shows a schematic illustration of a charging station according to aspects of the invention.

FIG. 1 schematically shows an illustration of a charging station 1, such as a charging column, in particular for charging electrical energy stores 2 of electrically operated motor vehicles 3.

Figure 2:
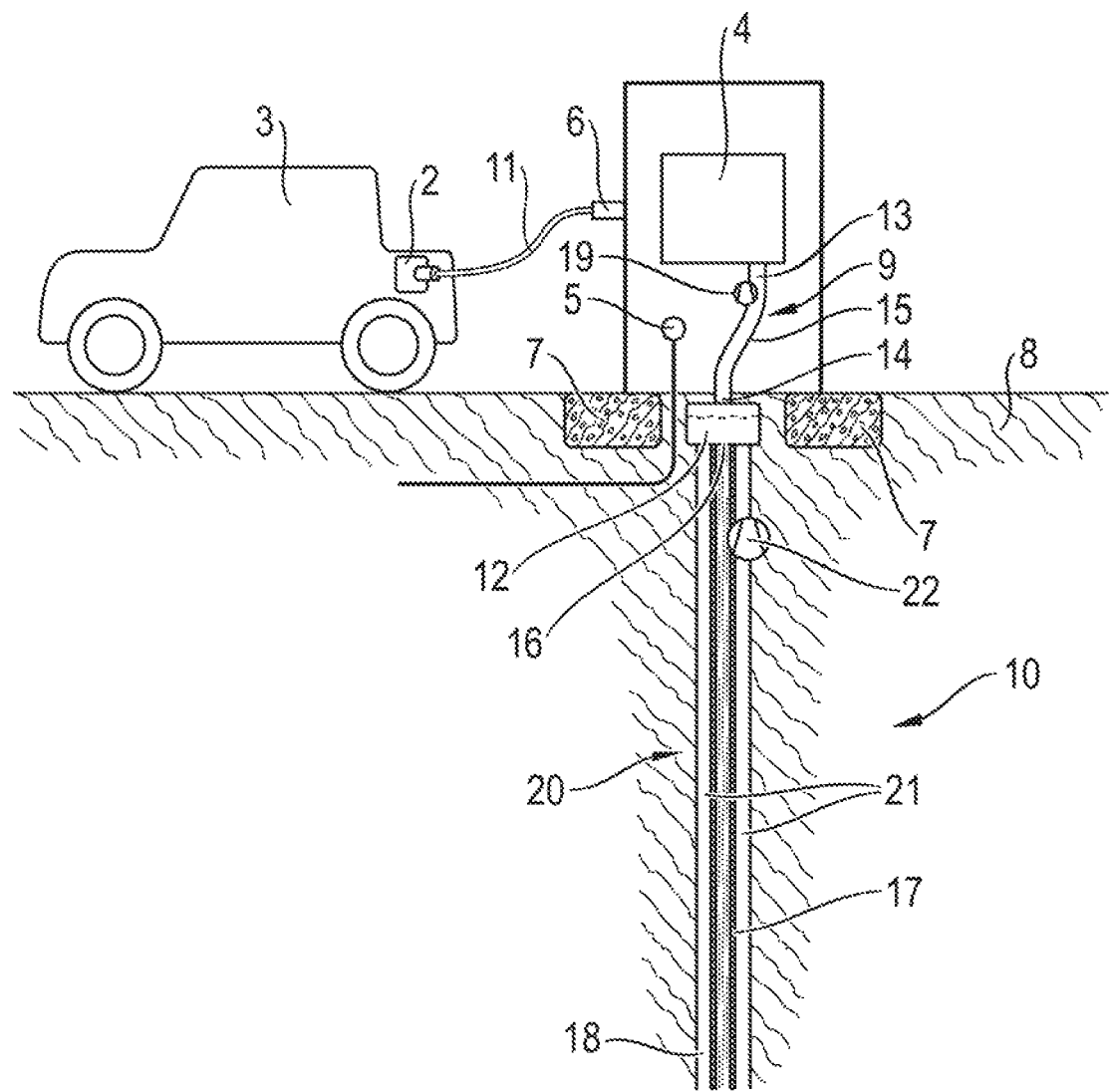
FIG. 2 shows a schematic illustration of an alternative charging station according to aspects of the invention.

FIG. 2 schematically shows an illustration of an electronics system 4, such as a power electronics system, in particular of a charging station, such as a Charging column, in particular for charging electrical energy stores 2 of electrically operated motor vehicles 3.

In FIG. 1, the charging station 1 and, in FIG. 2, the electronics system 4, respectively, stand on a foundation 7 incorporated in the ground 8 or in the earth.

In this case, the charging station 1, such as, in particular, the charging column, or the electronics system 4 has an electrical connection 5 for supplying current/voltage to the charging station 1 or to the electronics system 4. The charging station 1 also has a charging connection 6 for connecting at least one electrical energy store 2 that is to be charged.

The charging station 1 or the electronics system 4 has in this case a thermal connection 9 for connecting to a geothermal temperature control device 10 for controlling the temperature of the charging station 1 or the electronics system 4 by means of geothermal energy, As a result, the temperature of the charging station 1 and/or the electronics system 4 of the charging station 1 and/or other components of the charging station 1 can be controlled by means of geothermal energy. In this case, the power electronics system is preferably understood as the electronics system 4 or said power electronics system may comprise said electronics system. A charging cable may be considered to be a component 11, for example.

The charging station has a heat exchanger 12 or a heat pump, by means of which the temperature of a coolant 13 is controlled by means of geothermal energy, wherein the coolant 13 circulates in the charging station 1 and controls the temperature of an electronics system 4 and/or other components 11 of the charging station 1. As a result, the charging station 1 can be connected to the geothermal temperature control device 10 by means of the heat exchanger 12 or the heat pump.

In this case, it is particularly advantageous when the heat exchanger 12 or the heat pump has a coolant connection 14 for connecting to an, in particular charging-station-internal, coolant circuit 15 and/or the heat exchanger 12 or the heat pump has a geothermal connection 16 for connecting to a geothermal fluid circuit 17. As a result, the temperature of a coolant 13 that circulates in the charging station 1 can be controlled by means of a fluid 18 in the geothermal fluid circuit 17.

The coolant circuit 15 is provided or designed in such a way that the temperature of the electronics system 4 and/or other components 11 of the charging station 1 is controlled by a coolant 13 as fluid flowing through the coolant circuit 15. The coolant can thus flow, for example, through channels in the electronics system 4 and/or the components 11 in order to cool said electronics system and/or said components.

To this end, a first pump 19 can be provided, said first pump conveying the coolant 13 in the coolant circuit 15, in particular to the heat exchanger 12 or to the heat pump and from there back again.

In one exemplary embodiment of the invention, the geothermal fluid circuit 17 is provided in such a way that at least one ground borehole 20 is provided in the region of the charging station 1, in which ground borehole fluid lines 21 are arranged such that the temperature of a fluid 18 flowing through the fluid lines 21 is controlled by the geothermal energy. To this end, a second pump 22 can be provided, said second pump conveying the fluid 18 in the fluid lines 21 of the geothermal fluid circuit 17, in particular to the heat exchanger 12 or to the heat pump and from there back again.

It is advantageous when the fluid 18 of the geothermal fluid circuit 17 is a saline liquid. As a result, the fluid can be used virtually all year round and is protected against freezing. It is also advantageous when the coolant 13 of the coolant circuit 15 is a water/glycol mixture. This likewise serves for operation all year round with protection against freezing.

The invention makes provision for the charging station 1 and/or the electronics system 4 thereof and/or the components 11 thereof to be cooled and/or heated by means of the geothermal energy. This can be controlled depending on requirements by a control unit integrated into the charging station 1. In this case, the control unit in this regard can be integrated into the electronics system of the charging station or can be designed as a separate electronics system unit.

What is claimed is:

1. A charging station comprising:
   an electrical connection for supplying current/voltage to the charging station,
   a charging connection configured for connecting to at least one electrical energy store that is to be charged,
   a thermal connection to a geothermal temperature control device for controlling a temperature of the charging station by geothermal energy,
   a heat exchanger or heat pump for exchanging thermal energy between a coolant in the charging station and the geothermal energy of the thermal connection in order to control the temperature of the coolant, and
   a pump configured to circulate the coolant in the charging station to and from (i) the heat exchanger or heat pump, (ii) an electronics system of the charging station for cooling the electronics system, and (iii) the charging connection for cooling the charging connection.

2. The charging station as claimed in claim 1, wherein the heat exchanger or the heat pump has a coolant connection for connecting to a charging-station-internal coolant circuit, and the heat exchanger or the heat pump has a geothermal connection for connecting to a geothermal fluid circuit.

3. The charging station as claimed in claim 2, wherein the coolant circuit is configured in such a way that the temperature of either the electronics system or other components of the charging station is controlled by the coolant flowing through the coolant circuit.

4. The charging station as claimed in claim 3, wherein the pump is a first pump that is configured to convey the coolant in the coolant circuit to the heat exchanger or to the heat pump and back to the coolant circuit.

5. The charging station as claimed in claim 4, wherein the geothermal fluid circuit comprises at least one ground borehole in a region of the charging station, in which ground borehole fluid lines are arranged such that the temperature of a fluid flowing through the fluid lines is controlled by the geothermal energy.

6. The charging station as claimed in claim 5, further comprising a second pump configured to convey the fluid in the fluid lines of the geothermal fluid circuit to the heat exchanger or to the heat pump and back to the geothermal fluid circuit.

7. The charging station as claimed in claim 5, wherein the fluid of the geothermal fluid circuit is a saline liquid.

8. The charging station as claimed in claim 1, wherein the coolant of the coolant circuit is a water/glycol mixture.

9. The charging station as claimed in claim 1, wherein the charging station or the electronics system of the charging station or the components of the charging station are configured to be cooled or heated by the geothermal energy.

10. The charging station as claimed in claim 1, wherein the charging station is a charging column.

11. The charging station as claimed in claim 1, wherein the charging connection is cooled by the geothermal temperature control device.

12. The charging station as claimed in claim 1, wherein the charging connection is a charging cable that includes a connector that is configured to be releasably connected to a vehicle that includes the at least one electrical energy store that is to be charged.

13. The charging station as claimed in claim 1, further comprising channels in the electronics system of the charging station through which the coolant flow.

14. The charging station as claimed in claim 1, wherein the electronics system of the charging station comprises a first connection to the electrical connection, and a second connection to a coolant circuit of the charging station, wherein the pump is configured to circulate fluid through the coolant circuit of the charging station.

15. The charging station as claimed in claim 1, wherein the pump is positioned outside of the heat exchanger or heat pump.

* * * * *